D. C. JACKSON.
ALTERNATING CURRENT DYNAMO ELECTRIC MACHINE.
APPLICATION FILED FEB. 23, 1904.
924,991.
Patented June 15, 1909.
2 SHEETS—SHEET 1.
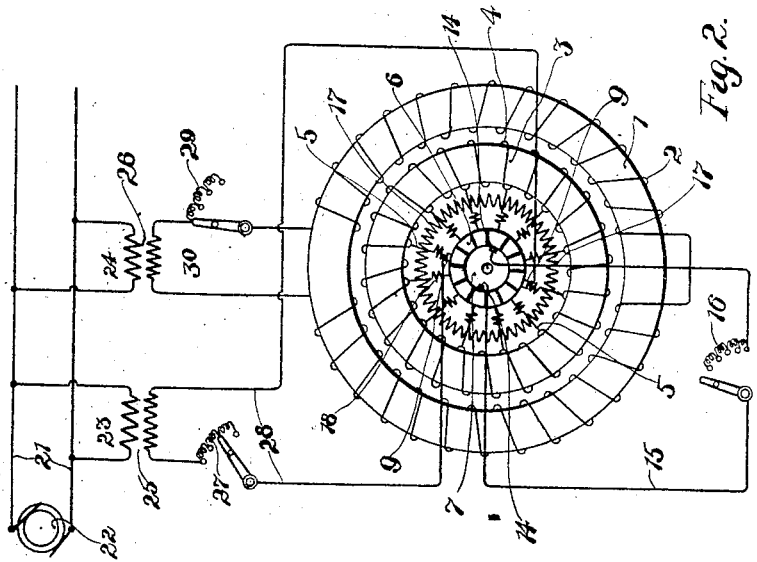
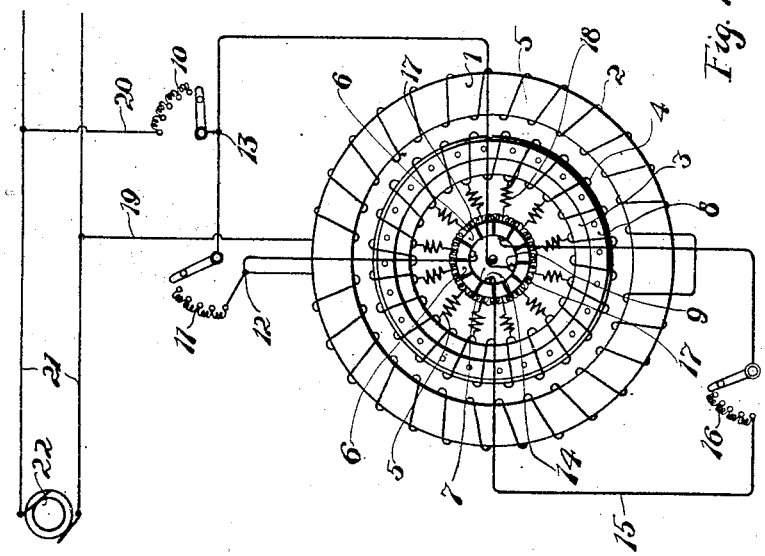
Witnesses:
Arthur H. Boettcher,
Charles J. Schmidt.
Inventor
Dugald C. Jackson
By Charles A. Brown
Attorney.

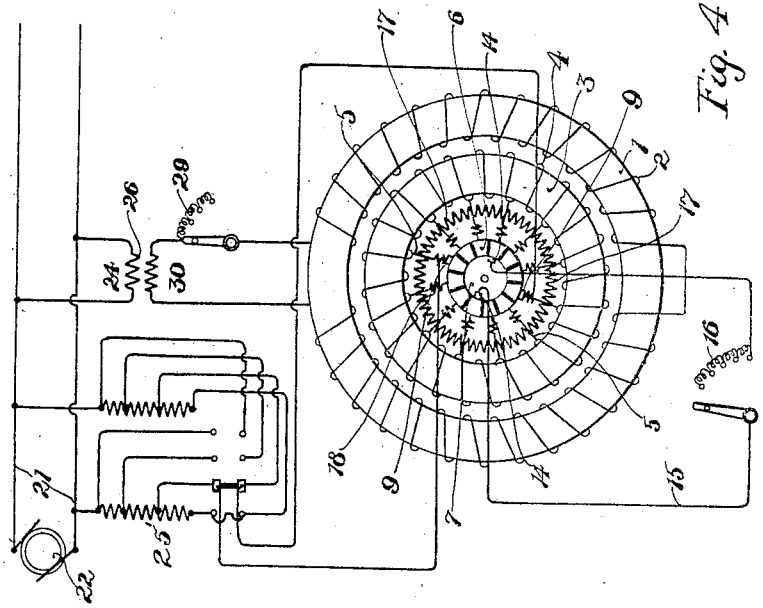
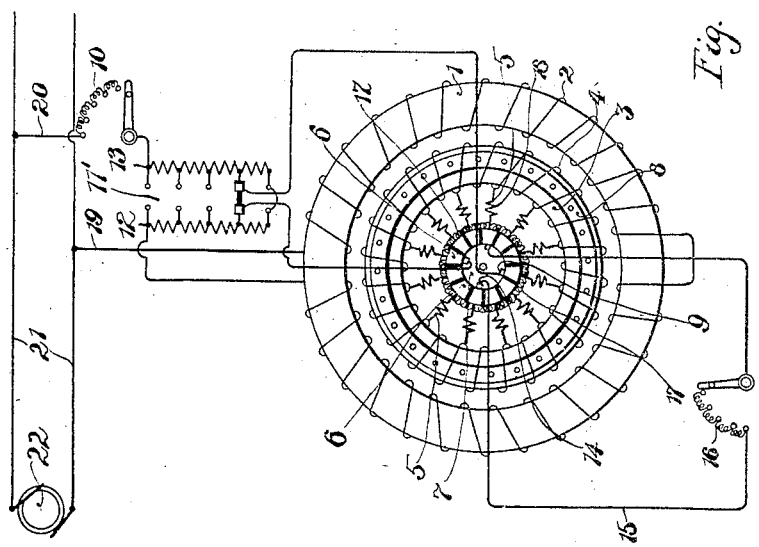

UNITED STATES PATENT OFFICE.

DUGALD C. JACKSON, OF MADISON, WISCONSIN.

ALTERNATING-CURRENT DYNAMO-ELECTRIC MACHINE.

No. 924,991.   Specification of Letters Patent.   Patented June 15, 1909.

Application filed February 23, 1904. Serial No. 194,722.

*To all whom it may concern:*

Be it known that I, DUGALD C. JACKSON, citizen of the United States, residing at Madison, in the county of Dane and State of Wisconsin, have invented a certain new and useful Improvement in Alternating-Current Dynamo-Electric Machines, of which the following is a full, clear, concise, and exact description, reference being had to the accompanying drawings, forming a part of this specification.

My invention relates to dynamo electric machines, and more particularly to variable speed alternating current motors, and has for its object improved means for controlling, such machines and for more accurately varying the speed thereof while injurious sparking at the brushes is at the same time prevented.

In my co-pending application, Serial No. 188,485 filed January 11, 1904, I have shown a motor of which the armature is provided with a winding and commutator, with resistances interposed in conductors leading from the armature winding to the commutator and other resistances bridged between suitable points on the winding or commutator.

The main object of my present invention to provide additional and improved circuit connections for a machine with an armature is this construction, which will enable the machine to be more readily controlled and by which its speed when used as a motor can be more accurately governed.

Figure 1 is a diagrammatic view showing one arrangement, the motor circuits being directly connected with the supply circuit. Fig. 2 shows a modified arrangement, the motor circuits being inductively connected with the supply circuit. Fig. 3 shows another modification, the motor being connected with the supply circuit through autotransformer mechanism, and Fig. 4 shows another modification, the motor being connected with the supply circuit through transformer mechanism of modified arrangement.

In Fig. 1 of the accompanying drawing I have shown a machine such as is described in the referred to co-pending application arranged to be operated as a motor. It consists of a field ring 1, provided with a field winding 2. The armature core 3 is provided with a continuous winding 4 connected by means of leads 5, 5 to segments 6, 6 of the commutator 7. The armature may also be provided with a short circuited winding 8 which may be of the squirrel-cage type. I have shown brushes 9, 9 connected in series with the field winding 2, which brushes may be placed in or near the normal neutral line. A variable resistance or impedance 10 may be adapted for serial inclusion in circuit with the brushes 9 and the field winding, and a variable impedance or resistance 11 may be bridged across the armature terminals 12, 13, as shown or this may be replaced by an autotransformer 11' or equivalent device by means of which the voltage impressed on the armature terminals may be varied as desired as shown in Fig. 3. By means of the controllers 10 and 11 the current flow through the field and brushes 9 may be controlled and the speed of the motor regulated. I also provide an additional set of brushes 14, 14 which may engage the commutator at a point off the normal neutral line, these brushes being included in an independent local circuit 15, which also may include variable resistance or impedance 16. By means of these additional brushes and controlling means 16 further and more accurate speed regulation can be attained and the working conditions of the motor improved. With brushes disposed as described there will be considerable sparking. To prevent this, however, I employ resistances 17, 17 as described in the above referred to and other co-pending applications, these resistances bridging between appropriate commutator segments or points on the armature winding. In this instance they are shown as connecting adjacent segments. The bridging resistances are preferably of comparatively high resistance and to prevent abnormal current flow through the leads 5, 5 from any armature coil which otherwise would practically be short circuited each time a brush bridges adjacent segments, I show a resistance 18 in each lead, whereby the abnormal current flow through the armature coils and leads is prevented. In the circuit connections shown in Fig. 1, which bring the field and armature winding into series relation, the conductors 19 and 20 leading to the motor are connected directly to the main conductors of the alternating current circuit 21 which is supplied with current from a source 22.

In Fig. 2 I have illustrated a modified arrangement of connections in which the field and armature are connected in independent circuits 28, 30 (giving the effect of a shunt machine) and the secondary windings of transformers 25 and 26 (with primary windings respectively in branches 23 and 24 from the main circuit) may be included respectively in said circuits. Variable impedance or resistance 27 of appropriate quality is adapted for inclusion in the secondary circuit 28, including the brushes 9, 9, and variable resistance or impedance 29 may be included in the secondary circuit 30 which includes the field winding 2 of the motor. The transformers 25 and 26 need not be of equal ratios of transformation but should be properly adapted to the characters of the windings used on the motor. Transformer 25 and controller 27 may be replaced by an autotransformer 25' or equivalent device for varying the voltage impressed on the armature within appropriate limits as shown in Fig. 4. As in the arrangement shown in Fig. 1, I here also connect additional brushes 14, 14 in a local circuit 15, which is independent from the external main circuit. A variable resistance or impedance of appropriate quality 16 is adapted for inclusion in said circuit for purposes of regulation. In this modification as depicted, the short circuited winding is not employed, the operation of the motor being entirely dependent upon the reaction due to the commutated winding which, if the resistances 17, 17 bridging between the armature leads are suitably chosen with that in view, may act to give the joint effect of a commutated winding and a short circuited winding.

By means of the arrangements of the brushes and circuits as described, the speed and torque of the motor may be very accurately controlled, thus causing the motor to be well adapted for the propulsion and operation of electric vehicles.

I do not wish to be limited to the exact and precise arrangements shown, as modifications may readily be made without departing from the scope of the invention, but Having described my invention, I claim as new and desire to secure by Letters Patent:

1. In combination, a field magnet connected with a source of alternating current, an associated armature core, a commutated winding on said core, a commutator connected by suitable leads with said commutated winding, a set of brushes bearing on said commutator and connected to receive current from said source of alternating current, a secondary set of brushes bearing on said commutator, a local circuit connecting the brushes of the secondary set, and resistances partially short-circuiting said commutated winding.

2. In combination, a field magnet connected with a source of alternating current, an associated armature core, a commutated winding on said core, a commutator connected by suitable leads with said commutated winding, a set of brushes bearing on said commutator and connected to receive current from said source of alternating current, a secondary set of brushes bearing on said commutator, a local circuit connecting the brushes of said secondary set, and conductors of high non-inductive resistance connected in bridge of said leads.

3. In combination, a field magnet, an autotransformer connected in series with said field magnet to a source of alternating current, an armature having a commutated winding and a closed circuited winding associated with said field magnet, a commutator connected by suitable leads with said commutated winding, a set of brushes bearing on said commutator and deriving current from said auto-transformer, a secondary set of brushes bearing on said commutator, a local circuit connecting the brushes of said secondary set, resistances serially included in the leads connecting the commutator with the commutated winding, and resistances partially short-circuiting said commutated winding.

4. In combination, a field magnet, an autotransformer connected in series with said field magnet to a source of alternating current, an armature having a commutated winding, a commutator connected by suitable leads with said commutated winding, a set of brushes bearing on said commutator and deriving current from said auto-transformer, a secondary set of brushes bearing on said commutator, a local circuit connecting the brushes of said secondary set, resistances serially included in the leads connecting the commutator with the commutated winding, and resistances partially short-circuiting said commutated winding.

5. In combination, a field magnet, an autotransformer connected in series with said field magnet to a source of alternating current, an armature having a commutated winding and a closed circuited winding associated with said field magnet, a commutator connected by suitable leads with said commutated winding, a set of brushes bearing on said commutator and deriving current from said auto-transformer, a secondary set of brushes bearing on said commutator, a local circuit connecting the brushes of said secondary set, and resistances partially short-circuiting said commutated winding.

6. In combination, a field magnet, an autotransformer connected in series with said field magnet to a source of alternating current, an armature having a commutated winding, a commutator connected by suitable leads with said commutated winding, a set of brushes bearing on said commutator and deriving current from said auto-transformer, a secondary set of brushes bearing on said commutator, a local circuit connecting the brushes of said secondary set, and resistances partially short-circuiting said commutated winding.

7. In combination, a source of alternating current, a motor having its field winding connected with said source, an auto-transformer connected in series with said field winding, an associated armature having a commutated winding connected by suitable leads with a commutator, a set of brushes bearing on said commutator at or near the normal neutral line and deriving current from said auto-transformer, a secondary set of brushes bearing on said commutator at points removed from the normal neutral line, the brushes of the secondary set being connected through an independent circuit, means for controlling the various circuits, resistances serially included in said leads, and other resistances connected in bridge of the leads and serving partially to short circuit the coils of the commutated armature winding.

8. In combination, a source of alternating current, a motor having its field winding connected with said source, an auto-transformer connected in series with said field winding, an associated armature having a commutated winding connected by suitable leads with a commutator, a set of brushes bearing on said commutator at or near the normal neutral line and deriving current from said auto-transformer, a secondary set of brushes bearing on said commutator at points removed from the normal neutral line, the brushes of the secondary set being connected through an independent circuit, means for controlling the various circuits, and resistances connected in bridge of the leads and serving partially to short circuit the coils of the commutated armature winding.

In witness whereof, I hereunto subscribe my name this sixteenth day of February A. D., 1904.

DUGALD C. JACKSON.

Witnesses:
WM. B. JACKSON,
DORA E. CASEY.